(12) United States Patent
Dean, Jr. et al.

(10) Patent No.: US 7,261,469 B1
(45) Date of Patent: Aug. 28, 2007

(54) PRECISION INSERT FOR MOLDING FERRULES AND ASSOCIATED METHODS OF MANUFACTURE

(75) Inventors: David L. Dean, Jr., Hickory, NC (US); Alan J. Malanowski, Newton, NC (US); Joseph T Cody, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/452,050

(22) Filed: Jun. 13, 2006

(51) Int. Cl.
*G02B 6/38* (2006.01)
*G02B 6/26* (2006.01)
*A01J 21/00* (2006.01)

(52) U.S. Cl. .................. 385/60; 425/468; 264/1.25
(58) Field of Classification Search ............ 264/1.25
See application file for complete search history.

(56) References Cited

U.S. PATENT DOCUMENTS 5,707,565 A * 1/1998 Suzuki et al. ............. 264/1.25
6,663,377 B1    12/2003 Dean et al. ................ 425/190
6,761,489 B1     7/2004 Dean et al. ................. 385/78
6,767,199 B2 *   7/2004 Dean et al. ............. 425/192 R
2005/0036742 A1 * 2/2005 Dean et al. ................. 385/71

* cited by examiner

*Primary Examiner*—Michelle Connelly-Cushwa
*Assistant Examiner*—Chris H. Chu
(74) *Attorney, Agent, or Firm*—Jeffrey S. Bernard

(57) ABSTRACT

A precision mold insert and method for manufacturing angled or angled and bumpered multi-fiber ferrules. The precision mold insert includes an angled end face forming portion, one or more optional bumper forming portions, one or more fiber bores for receiving one or more fiber bore forming pins, and one or more guide pin holes for receiving one or more guide pin hole forming pins. A method for manufacturing a precision mold insert for molding angled or angled and bumpered multi-fiber ferrules utilizing electrical discharge machining (EDM) process and/or a poly crystalline diamond (PCD) grinding tool is provided. The mold insert is used to produce a multi-fiber ferrule having a pre-molded angled end face that is not machined, polished or otherwise altered subsequent to the molding process. The ferrule may also include bumpers for polishing end portions of optical fibers positioned within the fiber bores without altering the angled end face.

8 Claims, 6 Drawing Sheets

PRECISION INSERT FOR MOLDING FERRULES AND ASSOCIATED METHODS OF MANUFACTURE

BACKGROUND OF THE INVENTION

1. Field of the Invention

The present invention relates generally to a mold insert for molding multi-fiber ferrules, and more specifically, to a precision insert for molding angled and bumpered multi-fiber ferrules and associated methods of manufacture.

2. Technical Background

Fiber optic cables require optical connectors or ferrules to link discrete segments of optical fibers. As used herein, the term "ferrule" refers to a component of a connector assembly that receives a terminal end of one or more optical fibers or an optical fiber ribbon and aligns with an opposing ferrule to optically couple corresponding optical fibers to transmit an optical signal or signals. In order to minimize signal losses across a ferrule-to-ferrule optical connection, it is important that the opposing optical fibers be precisely aligned. The precision of opposing optical fibers is more sensitive with multi-fiber ferrules due to the presence of multiple optical fibers and the tolerance buildup associated the location of each fiber relative to the other fibers and relative to a common axis.

Referring to FIGS. 1a-b, a prior art multi-fiber ferrule 10 typically includes a plurality of optical fibers arranged in one or more rows along the end face 12 of the ferrule. The "end face" of the ferrule refers to the portion of the ferrule that includes the optical fiber bores 11 and is disposed between a pair of openings 13 for receiving guide or alignment pins. The portion of the end face including and adjacent the optical fiber bores 11 is referred to herein as the "region of interest" 14 (see FIG. 1b) and in the prior art ferrules shown, is altered after molding by contact during subsequent machining and polishing processes. Ferrules may be produced having an end face 12 perpendicular to the longitudinal axis of the ferrule body. As shown, ferrules may also be produced having an end face 12 with an angle other than perpendicular to the longitudinal axis of the ferrule body, such as an end face having an angle of about 8 degrees based on industry standards. Ferrules may also be produced with an end face 12 having both a flat (perpendicular) portion and an angled portion. The angle is typically introduced into the end face 12 of the ferrule body by machining (e.g., grinding) the end face a flat ferrule subsequent to the ferrule molding process. By machining the angle in as opposed to molding the angle, the end face 12 of every ferrule must be individually machined after being removed from the mold. Subsequent machining steps may lead to a decrease in uniformity and a decrease in the predictability of performance, as well as a significant increase in production time.

In addition to the disadvantages described above, subsequent machining may also result in movement of the optical fiber bores 11 as the angle is machined into the end face 12, thus adversely affecting the positions of the fibers in the final angled ferrule and decreasing ferrule performance. In particular, the positions of the optical fiber bores 11 after the ferrule is removed from the mold may differ from the positions of the optical fiber bores after the end face is machined to introduce the angle. The movement of the fiber bores 11 may result from the wavering of the fiber bore forming pins throughout the length of the ferrule body or the inability to maintain the pins in straight parallel positions during the molding process. FIGS. 2a and 2b illustrate the positions of the fiber bores 11 before and after machining.

FIG. 2a is an end face view of a molded ferrule 10 having a flat end face portion 16 molded perpendicular to a longitudinal axis of the ferrule body. The position of each individual fiber bore 11 results from the position of the corresponding fiber bore forming pin at the interface with the mold insert. Thus, the positions of the fiber bores 11 are controlled to provide a single row of fiber bores positioned along a common axis X. Referring to FIG. 2b, as the flat end face portion 16 is machined to introduce an angle on the end face (the angled portion is indicated generally at reference number 12), the optical fiber bores 11 may move relative to their initial positions due to the inability to maintain the straightness of the fiber bore forming pins during the molding process. While a very slight movement of the fiber bores 11 after polishing may not adversely affect ferrule performance, a movement of more than about 0.1 microns from the initial position of the bore away from or along the common axis 18 result in fiber-to-fiber misalignment and decreased ferrule performance.

Therefore, it is desirable to rapidly and economically produce a large number of substantially identical ferrules having an end face with a predetermined angle relative to the longitudinal axis of the ferrule body, without having to machine each ferrule subsequent to the molding process. Further, it would be desirable to produce a molded ferrule having an end face that does not require machining or polishing the end face, and particularly the region of interest, subsequent to the ferrule molding process. Still further, it would be desirable to mold a multi-fiber ferrule having an angled end face including a plurality of optical fiber bores positioned in controlled and predictable positions along a common axis on the end face of the ferrule using a precision mold insert and molding process to avoid the possibility of fiber bore drift that commonly occurs during machining the end face of the ferrule subsequent to molding. To achieve such a molded ferrule, what is needed is a precision mold insert and associated method for manufacturing a multi-fiber ferrule using the precision insert.

SUMMARY OF THE INVENTION

In one aspect, the present invention is directed to a precision mold insert for molding multi-fiber ferrules having a molded-in angled end face that does not require machining, and in some embodiments polishing, subsequent to the molding process. In another aspect, the present invention is directed to a precision mold insert for molding multi-fiber ferrules having an angled and bumpered end face. The precision mold insert may be configured to mold any multi-fiber ferrule, including for example single row or multi-row 2f, 4f, 8f, 12f, 24f, 32f, 48f and 72 fiber ferrules, among others.

In another aspect, the present invention is directed to a method for fabricating a pre-angled precision insert for molding angled, and in some embodiments bumpered, multi-fiber ferrules. The mold insert provides the precise fiber bore and guide pin hole locations and diameters required for high-performance single and multi-mode ferrules. The mold insert is formed from a molding blank consisting of rough dimensions for the ferrule end face features. Starter fiber bore and guide pin holes are then preferably created in the blank using an Electrical Discharge Machining (EDM) process. The fiber bore and guide pin holes are preferably undersized as compared to the desired final dimensioned fiber bore and guide pin hole diameters. In one exemplary mold fabricating process, the fiber bore and guide pin holes may be undersized by about 1 to about 5 microns as compared to the desired final diameters. The final fiber bores and guide pin holes are preferably formed within about 1 to about 2 microns from nominal. The mold insert thickness is oversized to accommodate for grinding in the angle. The angle is then ground into the end face of the insert using a conventional grinder or other suitable tool. Areas on either side of the angled surface are ground to the desired nominal thickness. Once the angle is completed, the features that create the bumper in the ferrule are installed, preferably using an EDM process such as plunge EDM to obtain a desired bumper depth. Final fiber bores and guide pin holes are then installed at the desired locations and hole sizes using a Poly Crystalline Diamond (PCD) grinding tool. The PCD grinding tool provides low surface roughness in the holes and is used to create the final dimensioned bore and hole locations and diameters. Final dimensioned bores and holes are preferably ground to about a 0.3 micron maximum offset, more preferably about a 0.1 micron maximum offset. Once the final holes are formed, fiber bore forming pins and guide pin hole forming pins may be loaded into the blank and the blank loaded into a molding tool.

In another aspect, the present invention is directed to a method for molding angled multi-fiber fibers using a precision mold insert that eliminates the need for machining a ferrule end face subsequent to the molding process. The precision mold insert may also be used to mold angled ferrules including bumpers that provide a polishing guide surface for polishing the plurality of optical fibers of the ferrule to a predetermined height and angle. Further, the introduction of bumpers to the ferrule allows the plurality of optical fibers to be polished without removing an appreciable amount of material from the end face, and in particular, without altering the region of interest of the ferrule. Thus, the precision mold insert and method for molding using the insert allows for multi-fiber ferrules to be polished without removing material from the surface of the end face surrounding the optical fiber bores, thus maintaining the positions of the optical fiber bores as molded. In contrast, conventional molding and subsequent machining methods result in movement of the fiber bores and guide pin holes as end face material is ground away to introduce an angle to the ferrule end face. Forming the final fiber bores and guide pin holes into the mold insert after the angle is installed permits the location and diameter of each hole to be precisely controlled, thus promoting ferrule uniformity.

In another aspect, the present invention is directed to a multi-fiber ferrule having an angled end face produced by the process of molding the ferrule using a molding tool including a precision mold insert having an angled surface for molding the angle directly onto the end face of the ferrule. In contrast to conventional ferrules having an angle that is ground onto the ferrule end face subsequent to the molding process, the molded ferrule of the present invention does not require machining subsequent to the molding process. In a further embodiment, the mold insert may define features for molding bumpers into the end face of the ferrule. The bumpers provide an optical fiber polishing surface for polishing the optical fibers to a predetermined height and angle without removing an appreciable amount of material from the end face of the ferrule, and in particular, without altering the region of interest.

Additional features and advantages of the invention will be set forth in the detailed description which follows, and in part will be readily apparent to those skilled in the art from that description, or will be readily recognized by practicing the invention as described herein, including the detailed description and claims which follow, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

DETAILED DESCRIPTION OF THE PREFERRED EMBODIMENTS

Figure 1A:
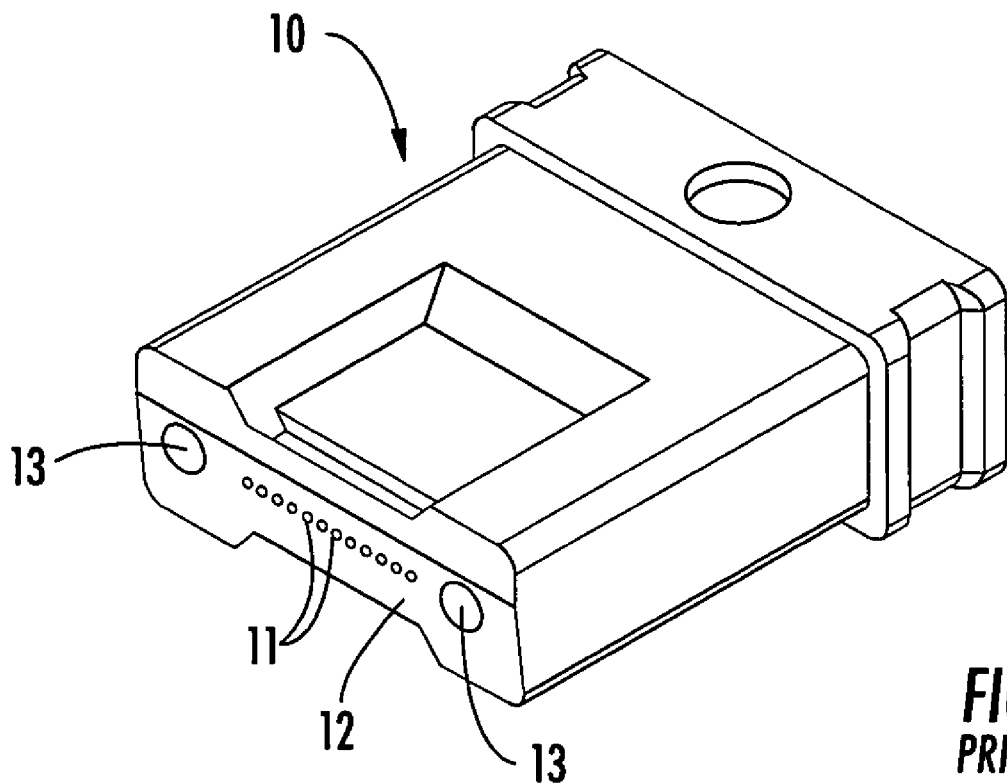
FIG. 1a is a perspective view of a prior art angled multi-fiber ferrule produced by molding a ferrule with a flat end face and machining an angle into the end face subsequent to the molding process.
Figure 1B:
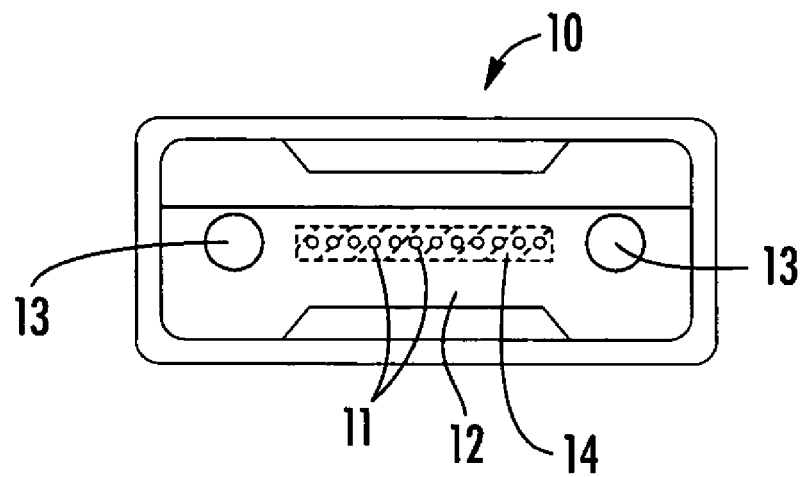
FIG. 1b is a view of the end face of the ferrule of FIG. 1 illustrating the ferrule region of interest.
Figure 2A:
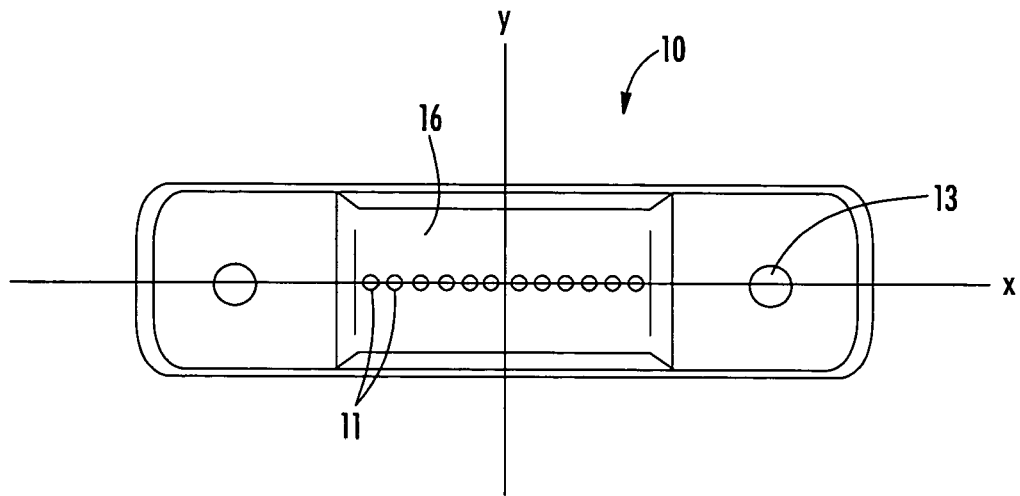
FIG. 2a is a view of the end face of a ferrule having a flat end face illustrating the position of the fiber bores prior to machining an angle onto the end face.
Figure 2B:
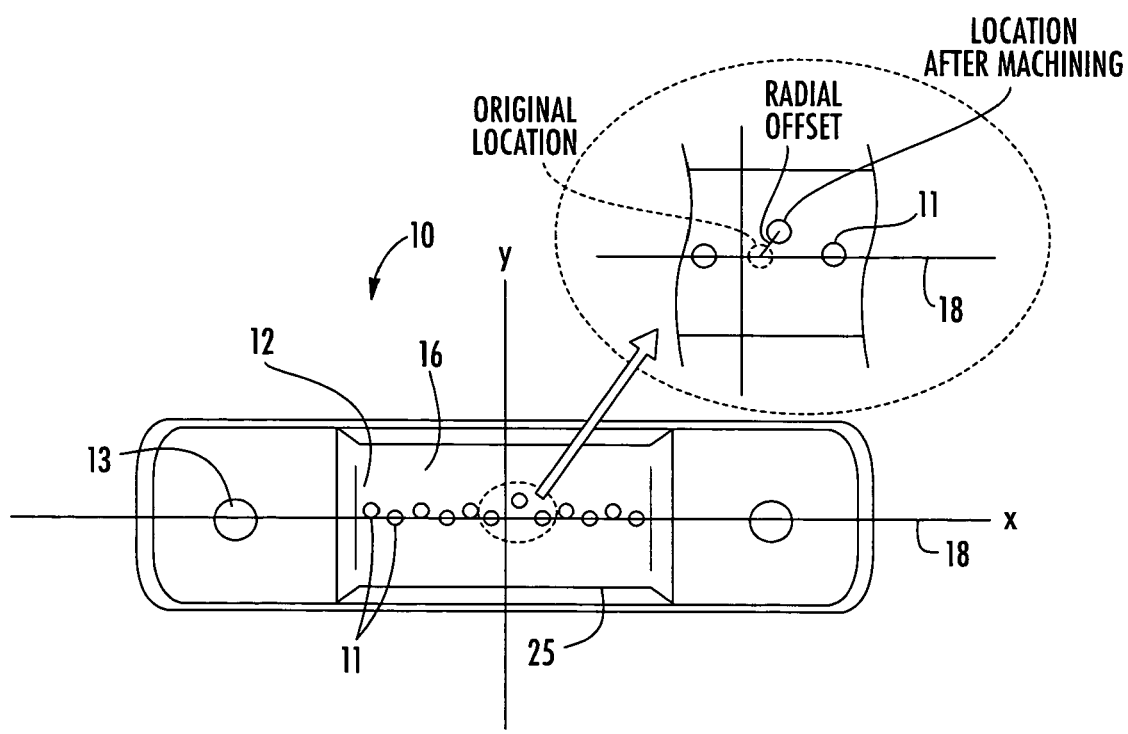
FIG. 2b is a view of the end face of the ferrule of FIG. 2a illustrating the positions of the fiber bores after machining an angle onto the end face.

Reference will now be made in detail to the present preferred embodiments of the invention, examples of which are illustrated in the accompanying drawings. Whenever possible, the same reference numerals will be used throughout the drawings to refer to the same or like parts. Although a precision mold insert for molding angled and bumpered multi-fiber ferrules is described and shown throughout the figures, the precision mold insert may be modified to remove the bumper forming features. However, as described below, bumpers disposed about opposing sides of a region of interest of a ferrule end face are advantageous in that they provide a polishing guide surface for polishing the one or more optical fibers of the ferrule to a uniform height and predetermined angle, such as about an 8 degree angle common in Angled Physical Contact (APC) type connectors used in the art. Further, although a specific number of optical fibers are shown throughout the various figures, it is envisioned that molded ferrules produced using the precision mold insert of the present invention may include any number of optical fibers arranged in one or more rows in order to produce 2f, 4f, 8f, 12f, 24f, 32f, 48f and 72 fiber ferrules, among others. In all embodiments, the precision mold insert improves the reproducibility of substantially identical parts.

Referring now to FIGS. 3a-d, various views of an exemplary molded multi-fiber ferrule 30 produced using the precision mold insert of the present invention are shown. The ferrule 30 defines an end face including a first end face surface 32 disposed normal to the longitudinal axis of the ferrule body 34, and a second end face surface 36 disposed at an angle relative to the first end face surface 32 and not normal to the longitudinal axis of the ferrule body 34. The first end face surface 32 and the second end face surface 36 are defined by a separation line 38 that extends above the fiber bores 11 and the guide pin holes 13 in the direction of the long lateral axis (i.e., X-direction) of the end face. The angle between the first end face surface 32 and the second end face surface 36 is in the range from about 6 to about 12 degrees, preferably from about 6 to about 10 degrees, and more preferably from about 7.8 to about 8.2 degrees. The plurality of fiber bores 11 open through the second end face surface 36, while the guide pin holes 13 open through outwardly projecting polishing bumpers 40. The fiber bores 11 and the axis of each guide pin opening 13 preferably remain parallel to the longitudinal axis of the ferrule body 34. Although not shown, the optical fibers may be flush with the second end face surface 36, but preferably protrude a predetermined distance from the second end face surface 36 and beyond the first end face surface 32. The ends of the optical fibers may be polished parallel to the first end face surface 32 and normal to the longitudinal axis of the ferrule body 34. Conversely, the ends of the optical fibers may be polished parallel to the second end face surface 36 and at an angle relative to the first end face surface 32 and the longitudinal axis of the ferrule body 34. Preferably, the polishing angle conforms to the angle between the first end face surface 32 and the second end face surface 36.

Figure 3A:
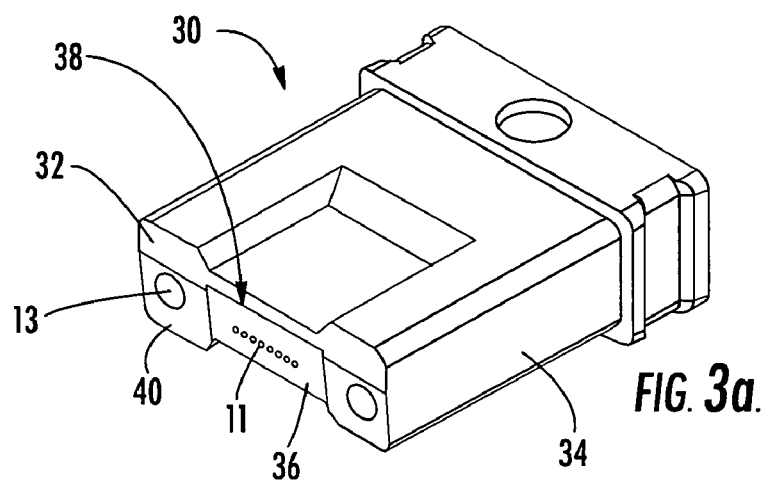
FIG. 3a is a perspective view of a multi-fiber ferrule having an angled and bumpered end face that is molded using a precision mold insert.
Figure 3B:
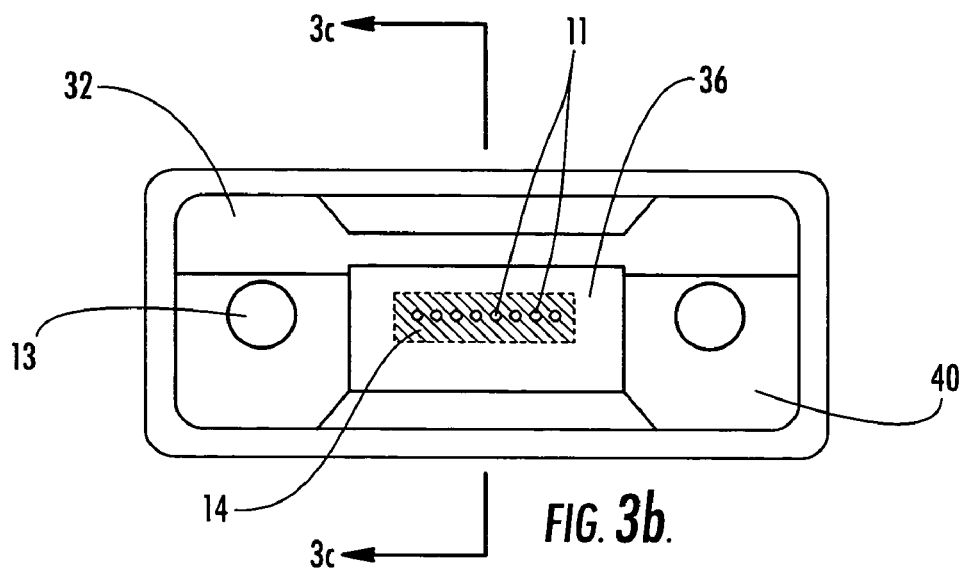
FIG. 3b is a view of the end face of the ferrule of FIG. 3a illustrating the region of interest adjacent the optical fiber bores.
Figure 3C:
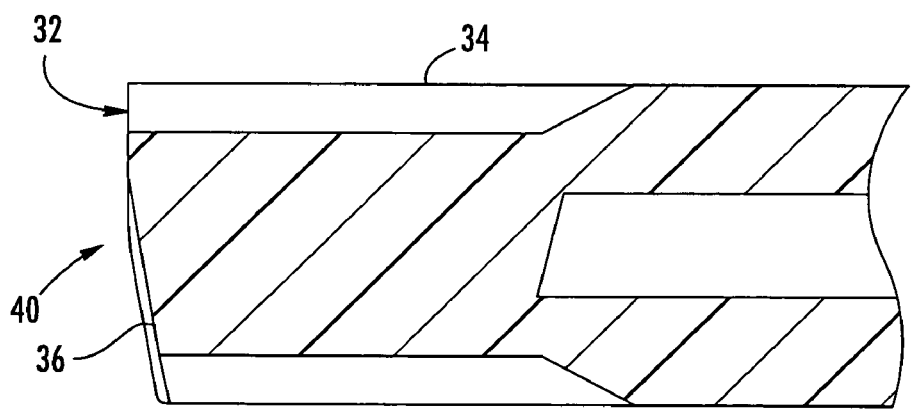
FIG. 3c is a cross-sectional view of FIG. 3b taken along line 3c-3c.

Referring specifically to FIG. 3b, the second end face surface 36 includes a region of interest 14 adjacent the optical fiber bores 11. The term "region of interest" 14 is used herein to describe at least a portion of the end face in the vicinity of the plurality of fiber bores 11. By molding in an angle as opposed to conventional ferrules where the angle is machined in subsequent to ferrule molding, the end face 32, and particularly the region of interest 14, is not altered subsequent to the molding process. As used herein throughout, the term "machining" includes any manufacturing or post-molding assembly process intended to remove more than an insubstantial amount of material from the end face, or to shape the end face to a predetermined configuration, such as grinding, routing, surface etching, etc. As used herein, the term machining is not intended to include fiber polishing and cleaning. While fiber polishing may remove an insubstantial amount of material from the end face, fiber polishing does not alter the geometry of the end face. In particular, the term "polishing" as used herein describes any now known or hereafter devised process applied to the optical connection end of the ferrule that does not remove a substantial amount of material from the region of interest around the fiber bores 11, and thus does not cause the optical fiber bores to drift.

Figure 3D:
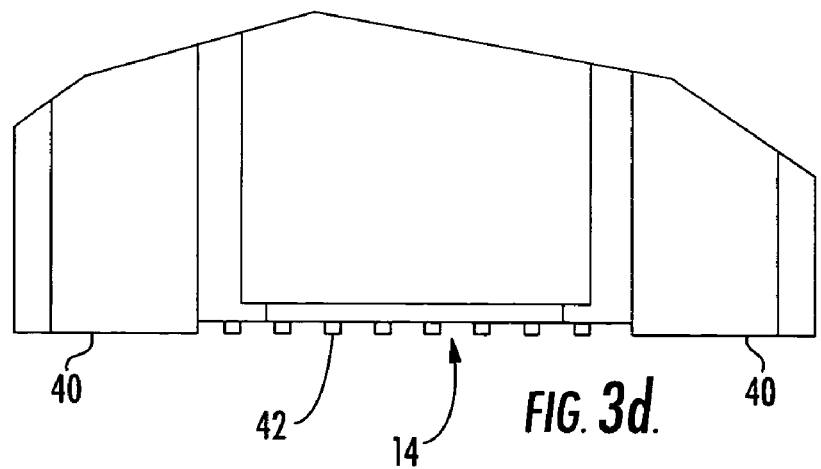
FIG. 3d is a view of a top portion of the ferrule of FIG. 3a including optical fibers positioned in the fiber bores to illustrate the use of bumpers to polish the optical fibers.

Referring specifically to FIG. 3d, the bumpers 40 serve as a guide for polishing the optical fibers to a predetermined height and angle. The height of the optical fibers may be determined by measuring the resulting height of the bumpers 40. In addition, by comparing the respective height of each bumper 40, it may be determined whether or not the polish angle is parallel to the second end face surface 36. A polishing angle parallel to the second end face surface 36 and at an angle relative to the first end face surface 32 and the longitudinal axis of the ferrule body 34 results from bumpers 40 of equal height. Likewise, a polishing angle parallel to the first end face surface 32 and normal to the longitudinal axis of the ferrule body 34 results in the bumpers 40 having equal heights at corresponding locations.

The plurality of fiber bores 11 are adapted to receive end portions of respective optical fibers 42. The guide pin holes 13 are adapted to receive alignment guide pins for aligning the end portions of optical fibers with corresponding end portions of opposing optical fibers of a mating multi-fiber ferrule. The plurality of fiber bores 11 generally open through a medial portion of the end face of the ferrule body 34, while the guide pin holes 13 generally open through a lateral portion of the end face of the ferrule body. The bumpers 40 extend outwardly in a forward direction relative to the end face. The plurality of optical fibers 42 may extend a predetermined distance beyond the surface of the end face 36. In all embodiments, the amount of protrusion of the optical fibers 42 from the end face 36 may be in the range from about 0 to about 15 microns, more preferably from about 3 to about 15 microns. The optical fibers are preferably polished in a substantially coplanar array of optical fibers.

As known to those skilled in the art, the ferrule may be assembled according to any conventional technique for assembling multi-fiber ferrules. In one assembly example, the ferrule is molded defining the angled end face 36, bumpers 40, a pair of guide pin holes 13 and a predetermined number of fiber bores 11 extending through the ferrule body for receiving the plurality of optical fibers 42. An adhesive may be inserted into the fiber bores 11, followed by the optical fibers 42. For a male ferrule, guide pins may also be inserted into the guide pin holes 13 for aligning mating ferrules. The ferrule assembly is then allowed to cure in a conventional oven, autoclave, or the like, in a known manner. Although not shown, the bumpers 40 are ground away after fiber polishing using any known grinding process, and may be ground to a depth equal to the surface of the end face 36, but are preferably ground to a depth greater than the surface of the end face 36.

Figure 4A:
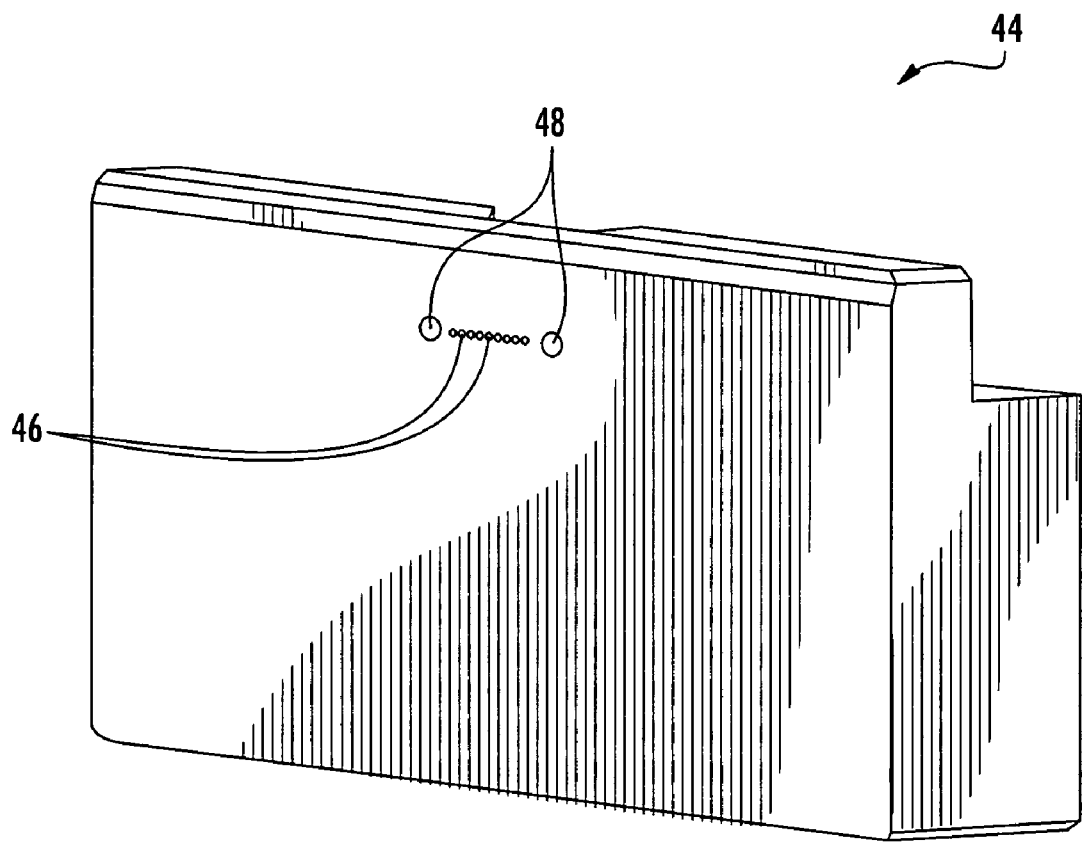
FIG. 4a is a perspective view of a precision mold insert including undersized fiber bores and guide pin holes.
Figure 4B:
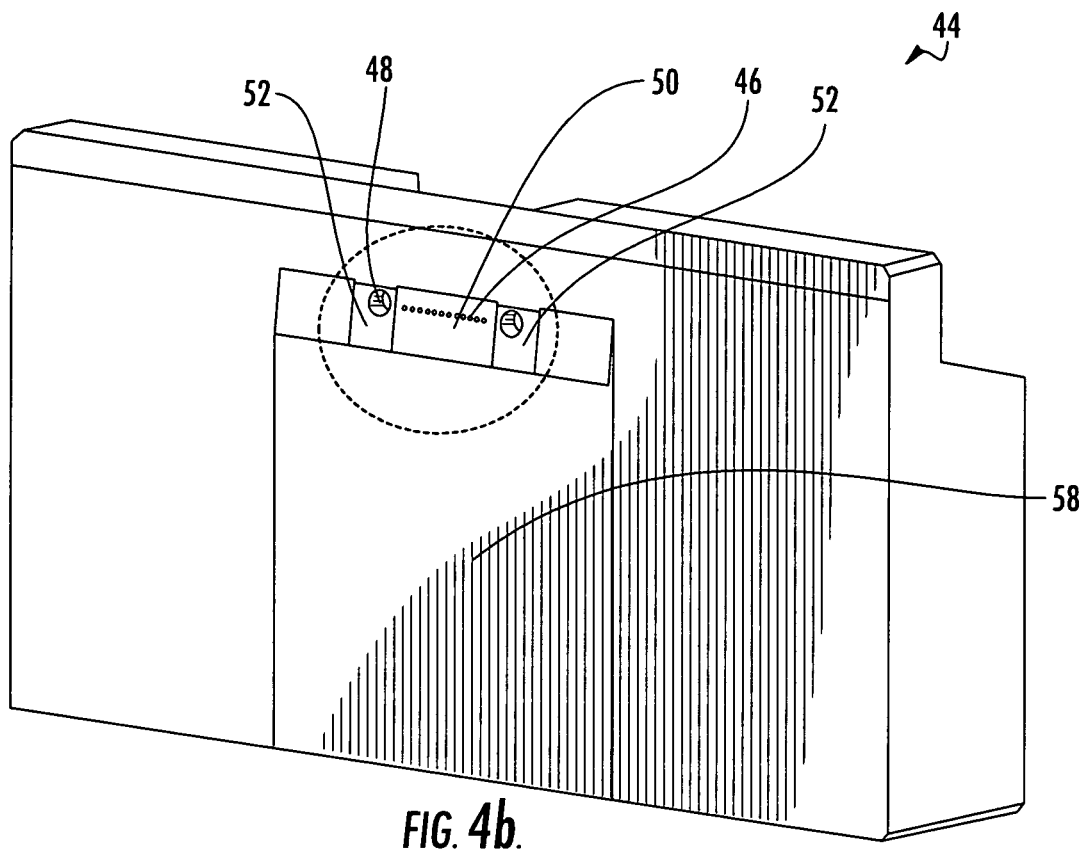
FIG. 4b is a perspective view of the precision mold insert of FIG. 4a including ground-in angle and bumper forming features.
Figure 4C:
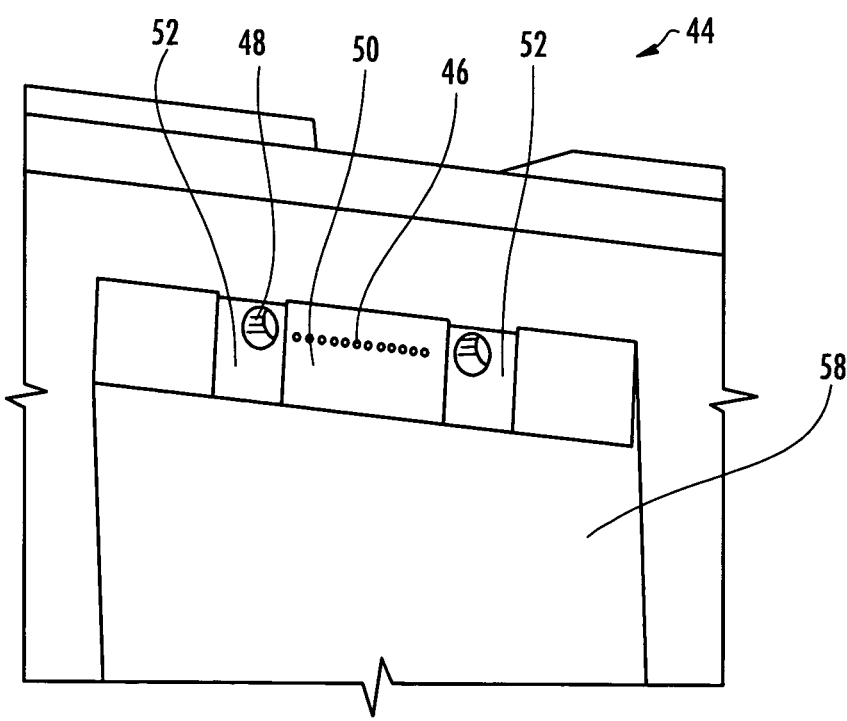
FIG. 4c is a detailed view of a portion of the mold insert of FIG. 4b illustrating the region of interest.

Referring to FIGS. 4a-c, a precision mold insert 44 and various stages of fabrication of a precision mold insert for molding a multi-fiber ferrule, such as that illustrated in FIGS. 3a-d, are shown. The precision mold insert is preferably used to mold large quantities of substantially identical ferrules having an angled end face and bumpers that does not require machining of the end face, and in particular machining in the region of interest, subsequent to the molding process. In an alternative design, the precision mold insert may be modified to produce multi-fiber ferrules having an angled end face that does not include bumpers. In a still further embodiment, the region of interest of the molded angled ferrule is not machined or polished subsequent to the molding process. The mold insert 44 provides the precise fiber bore and guide pin hole locations and diameters required for high-performance single and multi-mode ferrules.

Referring specifically to FIG. 4a, the mold insert 44 is created by starting with a mold blank including a molding face consisting of rough dimensions for the ferrule end face features. Starter fiber bores 46 and guide pin holes 48 are preferably formed in the blank using an electrical discharge machining (EDM) process. A starter bore may also first be created by conventional techniques such as drilling. The fiber bore and guide pin holes 46, 48 are preferably undersized as compared to their final diameters. In one exemplary mold insert fabricating process, the fiber bores and guide pin holes 46, 48 may be undersized by about 1 to about 15 microns, more preferably by about 5 to about 9 microns as compared to the final diameters. The fiber bore and guide pin holes are preferably located within about 1 to about 2 microns from nominal. The mold insert thickness is oversized to accommodate for grinding the angle into at least a portion of the end face.

An exemplary EDM process may include a precision wire EDM machine, or more preferably a submersible wire EDM machine, operable for removing metal from metal blanks by creating thousands of electrical discharges per second that flow between a wire and the metal blank, vaporizing metal in a controlled area. In the submersible wire EDM machine, a zinc-coated brass, molybdenum or tungsten wire of about 0.0005 to about 0.003 inches in diameter is submerged in a tank of dielectric fluid, such as de-ionized water, along with the metal blank. As the wire is moved relative to the metal blank, starter holes are formed in the blank. The motion of the wire may be controlled using any commercially available computer numerical control (CNC) software. A detailed discussion of the EDM processes is provided in the *Machinery Handbook* by E. Oberg et al, (Industrial Press, 1996) (25th edition) at page 1266, the disclosure of which is hereby incorporated by reference.

After the roughly dimensioned fiber bores and guide pin holes are formed, the angle is formed into the molding face of the insert 44 by a known grinding technique or EDM process that removes material from the blank. The angled portion of the precision mold insert 44 for forming the angled end face is indicated generally by reference number 50. The angle is ground into the molding face of the insert 44 and the area that forms the flat portion of the ferrule (i.e., perpendicular to the longitudinal axis of the ferrule body 34), is blended together with the rest of the blank to ensure a smooth ejection from the mold. Areas on either side of the angled surface are ground to the nominal thickness. Once the angle is completed, the bumper forming features 52 are ground into the blank, preferably using an EDM process such as plunge EDM to obtain a desired bumper depth. Final fiber bore and guide pin holes 46, 48 are then formed at the desired location and with the desired diameter using a poly crystalline diamond (PCD) grinding tool. The PCD grinding tool opens the holes to the correct desired diameter and location using a trepanning motion. The PCD grinding tool provides a low surface roughness in the holes and is used to create the final dimensioned diameters and locations. With a low surface roughness, the location and hole sizes are maintained to nominal for a longer period of time. Final dimensioned locations and diameters are preferably ground to about a 0.3 micron maximum offset, more preferably about a 0.1 micron maximum offset, and about a 0.2 micron tolerance. Once the final holes are properly ground, fiber bore forming pins and guide pin hole forming pins may be loaded into the blank and the blank loaded into a molding tool. In an alternative fabrication process, the optional bumper forming features 52 of the mold insert 44 are not formed in the blank. Furthermore, the bumper forming features 52 may be provided on the molding face prior to or after the final hole locations and dimensions are obtained.

The precision mold insert 44 aligns and retains at least one fiber bore forming pin and at least one guide pin hole forming pin during the molding of a ferrule. Any suitable jig (not shown) may be used to hold and to move the forming pins into and out of the openings. During the molding of a multi-fiber ferrule, the forming pins are inserted into the bores and holes and the molding material is injected into the mold cavity around the pins. After the mold material is allowed to set and cure, the forming pins are retracted to produce a plurality of molded bores and holes in the ferrule. The fiber bore forming pins are used to create a number of fiber bores sized and dimensioned to receive optical fibers in close tolerance. Since the location of the fiber bores can be precisely controlled and the forming pins are held in these precisely positioned bores during the molding process. Therefore, the molded bores on the end face of the ferrule created by the withdrawal of the forming pins are also precisely positioned. The precision of the location of the fiber bores at the end face 36 is repeatable over a large number of molding cycles. Although only one row of openings for fiber bore forming pins is shown, the present invention may have any number of openings arranged in any suitable number of rows.

Figure 5:
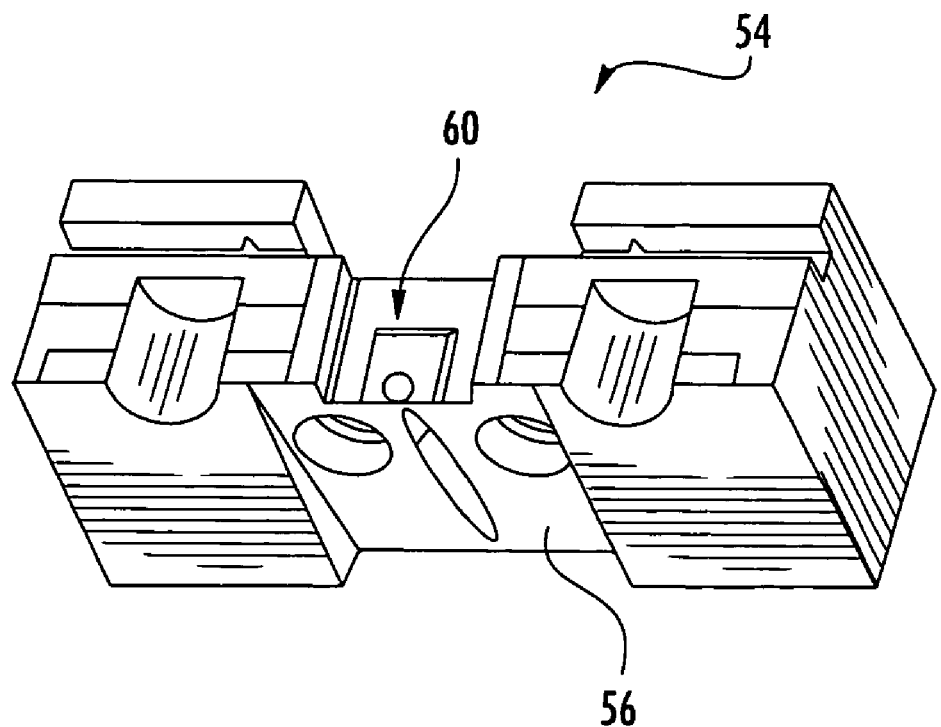
FIG. 5 is a bottom cavity insert used in cooperation with the angled and bumpered precision mold insert of the present invention.
Figure 6:
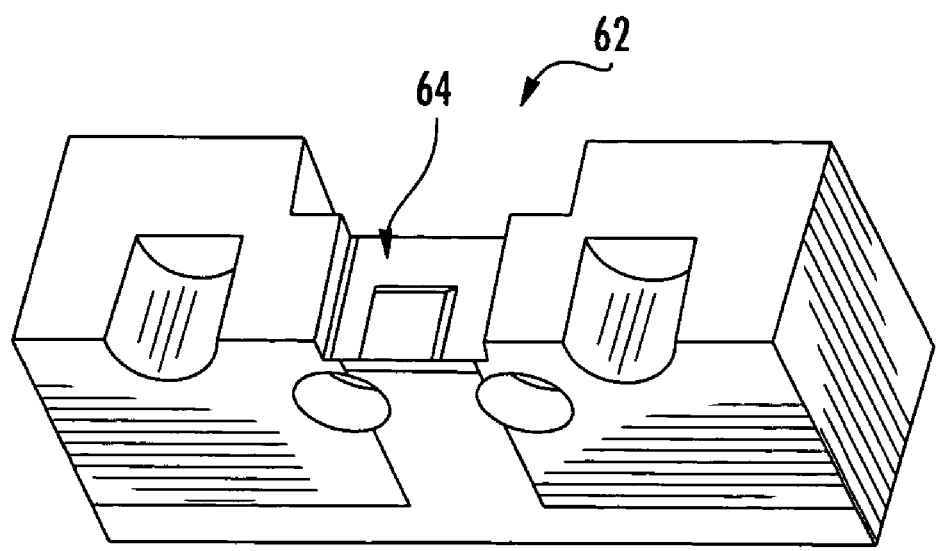
FIG. 6 is a top cavity insert used in cooperation with the angled and bumpered precision mold insert of the present invention.

Referring to FIG. 5, an exemplary bottom cavity insert 54 that may be used in cooperation with the precision mold insert 44 of the present invention to produce an angled and bumpered multi-fiber ferrule is shown. The bottom cavity insert 54 defines a recessed surface portion 56 that receives and aligns with protruding portion 58 (shown in FIGS. 4b and 4c) of the precision mold insert 44 to provide fine alignment between the mold insert and the bottom cavity insert 54. The bottom cavity insert 54 further defines a recess 60 for receiving ferrule-forming material and defines the structure of about the bottom one-half of the ferrule. Referring to FIG. 6, an exemplary top cavity insert 62 that may be used in cooperation with the precision mold insert 44 of the present invention and the bottom cavity insert 54 is shown. The top cavity insert 62 defines a recess 64 for receiving ferrule-forming material and defines the structure of about the top one-half of the ferrule. Both the bottom cavity insert and the top cavity insert may include venting features for allowing air to escape during the injection or pouring of ferrule body material into the mold.

The steps and techniques for fabricating the mold insert 44 result in more precise fiber bore and guide pin hole locations and diameters, which is required for high-performance single mode ferrules. Forming the final holes after the angle is formed permits the location and diameter of each hole to remain fixed subsequent to molding. In contrast, grinding the angle into the end face of the ferrule will cause the hole location to vary at the end face because the holes may drift in both the X and Y directions as the ferrule material is ground away. In addition, less time is needed for ferrule production because the angle is pre-molded. Subsequent to molding, the bumpers, whether angled or not, allow fiber polishing without removing an appreciable amount of material from around the fiber bores, thus providing an advantage from a control standpoint and performance predictability and uniformity. During polishing, flock may contact the angled end face without removing an amount of end face material sufficient to cause the fiber bores to drift. In contrast and as defined herein, machining may remove an amount of end face material sufficient to cause fiber bore drifting. In addition, a precision mold insert in accordance with the present invention obviates the need to grind each ferrule separately subsequent to molding, thereby reducing manufacturing costs.

It will be apparent to those skilled in the art that various modifications and variations can be made to the present invention without departing from the spirit and scope of the invention. Thus, it is intended that the present invention cover any and all modifications and variations of the invention provided they come within the scope of the appended claims and their equivalents.

That which is claimed is:

1. A method for manufacturing a precision mold insert for molding a multi-fiber ferrule having an angled end face, comprising:
    providing an angled end face forming portion for molding the angled end face onto the multi-fiber ferrule;
    providing one or more fiber bores for receiving one or more fiber bore forming pins using an electrical discharge machining process followed by a grinding tool process; and
    providing one or more guide pin holes for receiving one or more guide pin hole forming pins using an electrical discharge machining process followed by a grinding tool process.

2. The method according to claim 1, further comprising providing one or more bumper forming portions for molding one or more bumpers onto the multi-fiber ferrule.

3. The method according to claim 1, wherein the mold insert is produced by forming one or more undersized fiber bore and guide pin holes using an electrical discharge machining (EDM) process; grinding a predetermined angle onto a molding face of the mold insert; and forming one or more final dimensioned fiber bore and guide pin holes at a predetermined location to a predetermined diameter using a poly crystalline diamond (PCD) grinding tool.

4. A method for manufacturing a precision mold insert for molding an angled and bumpered multi-fiber ferrule, comprising:
    forming one or more undersized fiber bore and guide pin holes in a molding face of the mold insert using an electrical discharge machining (EDM) process;
    grinding a predetermined angle forming portion into the molding face of the mold insert;
    providing bumper forming features on the molding face of the mold insert; and
    forming final dimensioned fiber bore and guide pin holes at a predetermined location and to a predetermined diameter using a poly crystalline diamond (PCD) grinding tool.

5. The method according to claim 4, wherein the one or more undersized fiber bore and guide pin holes are about 5 to 9 microns smaller in diameter than the final dimensioned fiber bore and guide pin holes.

6. The method according to claim 4, wherein areas of the molding face on either side of the angle forming portion are a nominal thickness.

7. The method according to claim 4, wherein the one or more bumper forming portions are provided on the molding face prior to forming the one or more final dimensioned fiber bore and guide pin holes.

8. The method according to claim 4, wherein the bumper forming features are provided on the molding face of the mold insert using a plunge electrical discharge machining (EDM) process.

* * * * *